United States Patent [19]
Post et al.

[11] Patent Number: 5,777,775
[45] Date of Patent: Jul. 7, 1998

[54] MECHANICAL BEAM ISOLATOR FOR HIGH-POWER LASER SYSTEMS

[75] Inventors: Richard F. Post, Walnut Creek; Charles S. Vann, Fremont, both of Calif.

[73] Assignee: The Regents of the University of California, Oakland, Calif.

[21] Appl. No.: 732,734

[22] Filed: Oct. 18, 1996

[51] Int. Cl.⁶ .................................................. G02B 26/02
[52] U.S. Cl. .......................... 359/234; 359/227; 359/230; 359/236; 378/160
[58] Field of Search .......................... 359/227–236; 250/229, 231.1, 231.13, 231.14, 233; 378/160; 396/169, 185, 452

[56] References Cited

U.S. PATENT DOCUMENTS 3,926,527 12/1975 Pembrook et al. .................... 359/235
4,033,693 7/1977 Payrhammer et al. ................. 359/230
5,552,925 9/1996 Worley ................................. 359/227

FOREIGN PATENT DOCUMENTS 1439196 12/1968 Germany.

Primary Examiner—James Phan
Attorney, Agent, or Firm—Henry P. Sartorio; John P. Wooldridge

[57] ABSTRACT

A mechanical beam isolator uses rod-shaped elements having a Gaussian configuration to interrupt the path of a beam of photons or particles when the time-scale of the needed interruption is of the order of a microsecond or less. One or more of these rods is mounted transversely to, and penetrates through, a rotating shaft supported by bearings. Owing to the Gaussian geometry of the rods, they are able to withstand much higher rotation speeds, without tensile failure, than rods having any other geometrical shape.

9 Claims, 2 Drawing Sheets

MECHANICAL BEAM ISOLATOR FOR HIGH-POWER LASER SYSTEMS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to means for isolating the optical amplifier elements of high-power pulsed laser systems from the deleterious effects of light reflected back from elements, such as targets, lying downstream from those elements.

2. Description of Related Art

Pulsed laser systems employing amplifier elements composed of glass doped with special elements are used in inertial fusion systems. In these systems several beam lines are used, each of which has many amplifier elements in series to produce the high-intensity light pulses needed to irradiate target pellets. These amplifier elements are, by nature, bi-lateral in their performance. That is, they will amplify an incident light pulse, independent of whether it enters from the "down-stream" face of the element, or from its "up-stream" face. As a result there can arise a serious problem from light pulses reflected from, for example, the target region, back into the chain of amplifier elements. At the present time, the only available means to overcome this problem is to use expensive and complex optical or electro-optical systems that use such optical elements as polarizers and Faraday rotators or Pockels cells to block reflections. In addition to being expensive, these elements tend to introduce aberrations and optical attenuation in the beams, thus tending to compromise the performance of the laser system. The problem of beam isolation is therefore endemic to high-power pulsed laser systems.

SUMMARY OF THE INVENTION

It is an object of the present invention to provide a method and apparatus that provides isolation of the amplifiers of a laser system from the effects of reflected light pulses.

It is a also an object of the invention to provide a high-speed shuttering mechanism for beams of photons or particles.

The invention provides a mechanical means for interrupting the path of a beam of photons or particles when the time-scale of the needed interruption is of the order of a microsecond or less. The method employs rod-shaped elements having a special geometrical configuration. One or more of these rods is mounted transversely to, and penetrates through, a rotating shaft supported by bearings. Owing to the special geometry of the rods, they are able to withstand much higher rotation speeds, without tensile failure, than rods having any other geometrical shape.

As will be demonstrated, the optimal rod shape is a tapered profile, following the so-called Gaussian mathematical form. Only with this shape is it possible to achieve the highest rotation speeds with the rod-shaft assembly that forms the mechanical beam isolator. With this shape the tensile force within the rod is nearly constant along its length, falling smoothly to zero at its outer end. As a result of the choice of this particular geometrical form, the tip speeds of the rod can be made to be several times higher than that achievable with more conventional shapes, for example, a uniform-diameter rod.

DETAILED DESCRIPTION OF THE INVENTION

Figure 1:
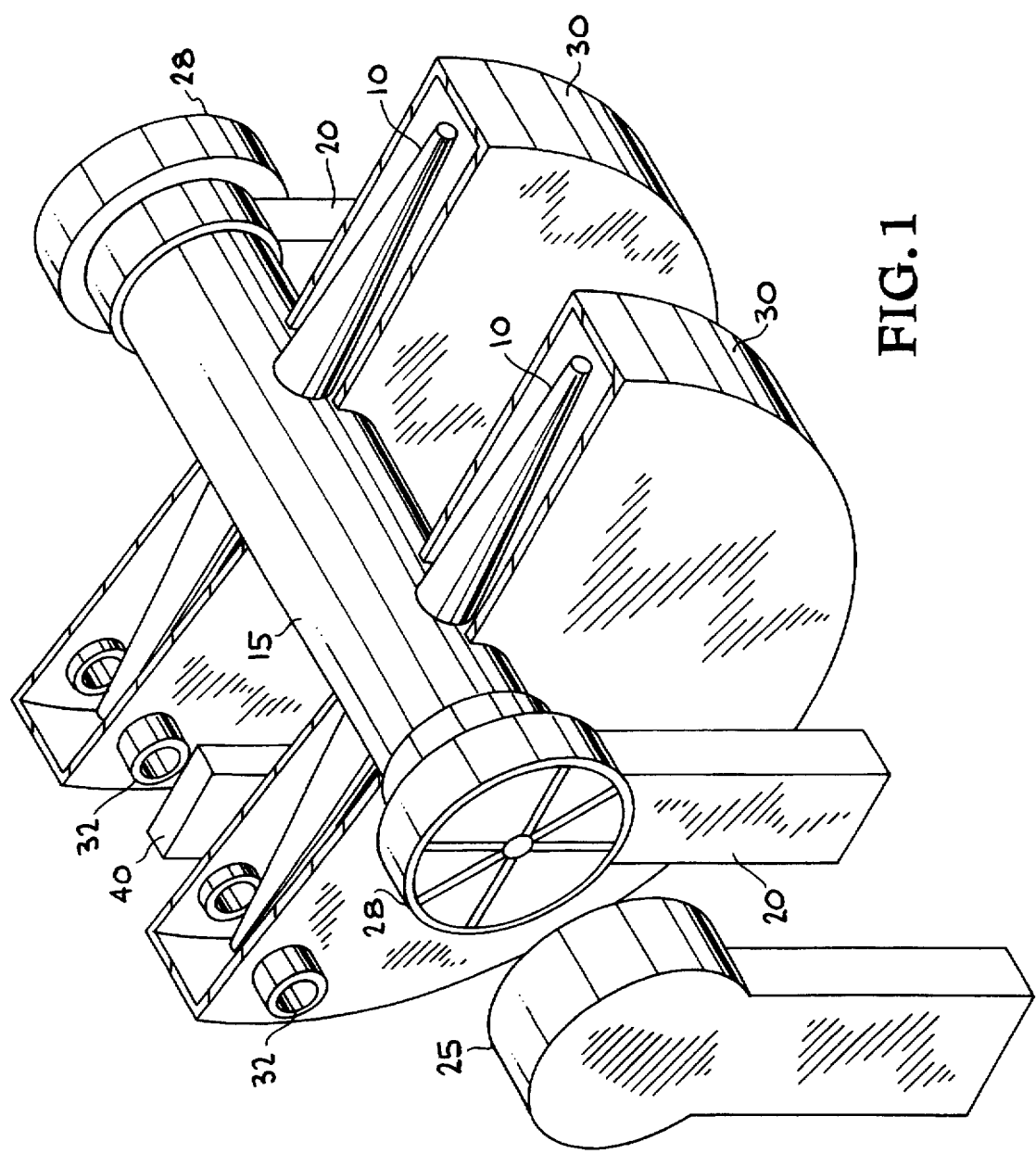
FIG. 1 shows a schematic drawing of a mechanical beam isolator employing two azimuthally aligned Gaussian-tapered rods mounted on a shaft.

The physical arrangement of parts in the invention is shown schematically in FIG. 1. As shown in the figure, one or more tapered rods 10 are mounted transversely and penetrate through a central shaft assembly 15 that is supported by bearings 20 and spun up to high speeds by an electrical drive motor or motors and powered by an electronic circuit. FIG. 1 shows motor winding 25 and planar Halbach array 28. Examples of concepts used in electrical motors and electronic circuits used in the present invention can be found in U.S. patent application Ser. No. 08/383,287, titled Halbach Array DC Motor/Generator, filed Feb. 3, 1995, which is fully incorporated herein by reference. The entire assembly is to operate in vacuum to minimize aerodynamic drag and heating. Enclosure 30 contains the rotatable tapered rod 10. A beam line tube 32 in enclosure 30 allows a beam of particles or light to propagate through the assembly. The supporting bearings may be either of a mechanical type, e.g. ball bearings, or they may be of the magnetic type, e.g., as described in U.S. Pat. No. 5,495,221, which is fully incorporated herein by reference. The rotation speed and angular position of the rods is to be synchronized to coincide with the time when the shuttering action is desired.

Since the upper limit on the rotation speed of the beam isolator that is the subject of the invention is limited by stresses caused by centrifugal forces, the material from which the rods are made is a critical item. The preferred material for achieving the highest possible speeds is graphite fiber-composite. Commercial grades of graphite fiber are available having strengths approaching 7.0 gigaPascals (GPa) (1.0 million psi). In a fiber composite composed of, for example, 65 percent graphite fibers by volume, and 35 percent epoxy resin, the tensile strength would be 4.5 GPa, and the density of the composite would be 1550 kg/m$^3$.

The figure of merit for materials from which to make the rods is the ratio of their tensile strength to their density, since the maximum tip speed that can be achieved is proportional to the quantity $\sqrt{S/\rho}$, where S is the tensile stress and $\rho$ is the density. On this basis graphite fiber-composite is the preferred material. However, if it is required by the application that a metallic rod should be used, titanium alloys represent viable candidates.

Given the use of the preferred materials to fabricate the rods, the possibility of achieving the sub-microsecond shuttering times that the subject invention offers is intimately related to the particular choice of the geometry of the rods that is made. It is possible to demonstrate mathematically that the particular geometry chosen in the invention, a Gaussian taper, is optimal as compared to all other geometries. The analytic proof is the following:

The problem can be approached analytically by posing the following question: Is there a taper function for a thin rod rotating about an axis through its mid plane such that the tensile stress in the rod is independent of radius at all radii (including infinite radius)?

Begin by defining the radial tensile stress at any radius in terms of the centrifugal force, F(r), arising from the remainder of the rod beyond that radius. This equation is:

$$F(r) = \rho \omega^2 \int_r^\infty A(r') r' dr' \text{ Newtons} \quad (1)$$

where $A(r)$ $m^2$ (meters is the cross-sectional area of the rod. Where $\omega$ is the angular velocity. Now require that the stress, $S(r)=F(r)/A(r)$ be a positive constant, independent of the radius, r. Normalizing $S(r)$, this condition is equivalent to the requirement:

$$\frac{\int_r^\infty A(r') r' dr'}{A(r)} = k^2 = \text{constant} \quad (2)$$

Where k is a constant. Now multiply both sides of this equation by $A(r)$ and take the derivative with respect to r of this expression, yielding a differential equation for $A(r)$:

$$-rA(r) = k^2 \frac{dA(r)}{dr} \quad (3)$$

The solution to this differential equation, with $A_0=A(r=0)$ is:

$$A(r) = A_0 \exp\left[ -\frac{r^2}{2k^2} \right] m^2 \quad (4)$$

Thus, in principle, if the rod area is tapered in a Gaussian manner the tip velocity can be made arbitrarily high (requiring, of course, an infinitesimally small diameter at its end). Practical limitations will define the amount of taper that can be tolerated, but, as will be shown, the gains (over a non-tapered rod) are substantial.

Now considering a truncated Gaussian rod, that is, one with a finite ratio of its diameter at the tip to that at its mid plane, the expression for the tensile stress as a function of radius becomes:

$$S(r) = \frac{1}{2} \rho \omega^2 a^2 \left\{ 1 - \exp\left[ -\frac{r_{max}^2 - r^2}{a^2} \right] \right\} Nm^{-2} \quad (5)$$

Figure 2:
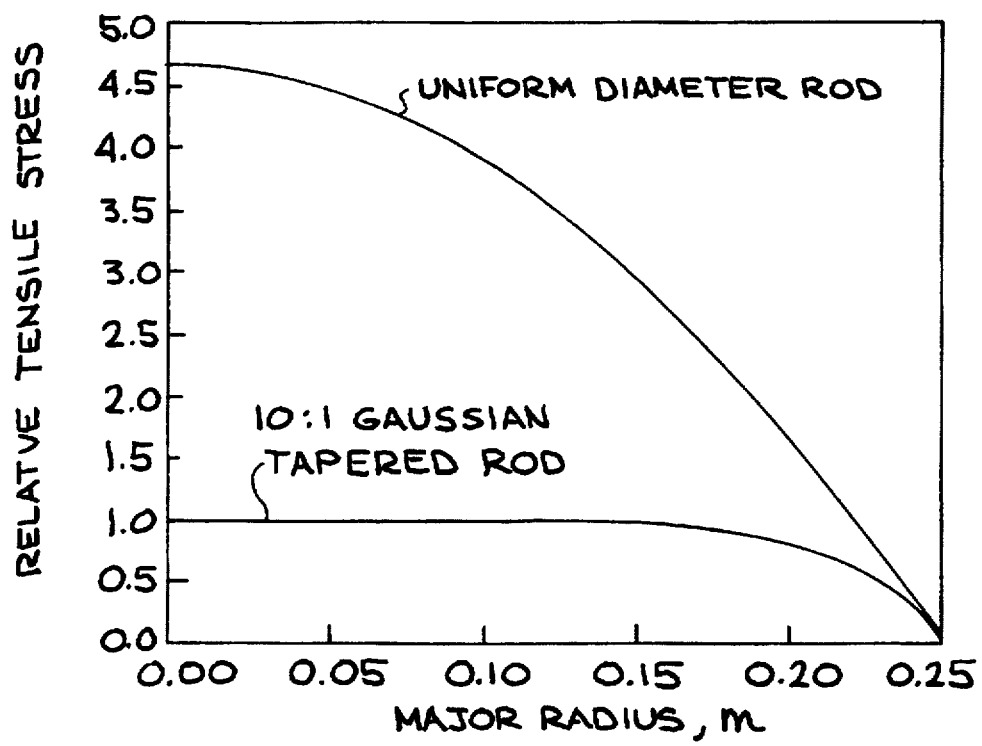
FIG. 2 is a graph showing a comparison of the relative tensile stresses in a Gaussian-tapered rod having a 10:1 thickness ratio (center diameter divided by diameter at the tip) with that in a uniform-diameter rod, as a function of radial position along the rod.

It is now possible to compare the maximum tensile stress and the profile of the tensile stress in a Gaussian tapered rod as compared to a rod of uniform diameter (obtained by taking the limit in equation (5) as $a \to \infty$). Where a is the characteristic length constant of the Gaussian function. This comparison is shown in FIG. 2, which plots the relative tensile stress as a function of position along the rod for (1): a 0.5 m. long Gaussian tapered rod with a diameter ratio, D, (diameter at the tip compared to diameter at its mid plane) of 0.1, and (2) a constant-diameter rod of the same length and rotating with the same tip speed. The relative constancy and the much lower value of the peak stress in the tapered rod is apparent.

Since the tip speed of the rod is given by the value of the quantity $(\omega r_{max})$, equation (5) may be used to derive an expression for the tip speed, $v_t$, in terms of the tensile stress at r=0, the density of the composite, $\rho$, and D, the ratio of the diameter of the rod at its tip to that at its center:

$$v_t = 2 \left[ \frac{\ln(1/D)}{1 - D^2} \right]^{1/2} \sqrt{\frac{S(r=0)}{\rho}} \text{ m/sec.} \quad (6)$$

Figure 3:
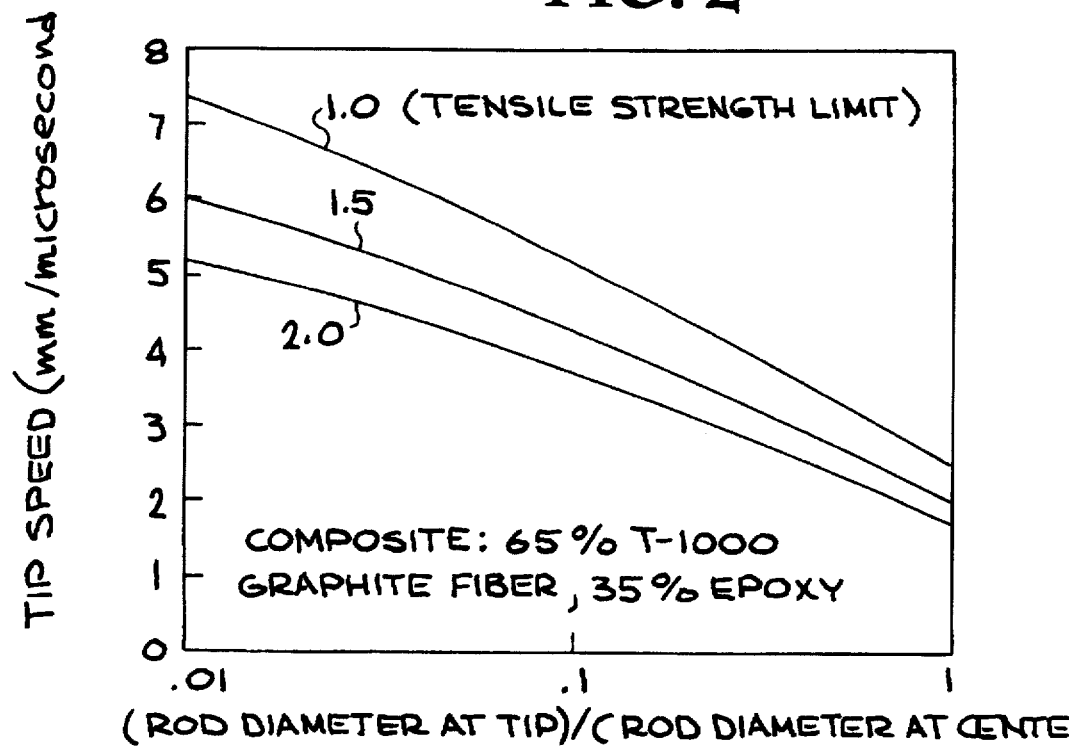
FIG. 3 is a graph showing the attainable tip speeds (in mm per microsecond) for tapered rods of different thickness ratios, and for various tensile safety factors.

The fiber-composite parameters previously stated for graphite-epoxy fiber-composite, namely, S=4.5 GPa, and $\rho$=1550 kg/m$^3$, may now be used to evaluate the attainable tip speed as a function of the above parameters. FIG. 3 is a plot of the tip speeds as a function of D, for three different values of the tensile safety factor, 1.0 (i.e., operation at the tensile strength limit), 1.5, and 2.0. The latter two values probably represent the general range that one would wish to operate in, although with special care a safety factor lower than 1.5 might be acceptable. Note that the abscissa of the plots is given in units of mm/µs (1 mm/µs=1000 m/s). These plots show that it is feasible to design a mechanical beam isolator with tip speeds of order 4 to 5 mm/µs, a substantially higher value than that obtainable with any conventional geometry, such as a disc or a uniform-diameter rod. (Note that the case of the uniform rod corresponds to the value D=1.0, i.e. the right-hand edge of the plots.)

In the application of Gaussian shaped rods to construct a mechanical beam isolator, one or more such rods are supported by a central shaft, through which holes have been bored and fixtures attached to hold the rods in place. If more than one rod is employed, the azimuthal location of these rods relative to each other, that is, the angle subtended by their axes relative to each other, will be determined by the application at hand. For example, in a high-powered laser system employing beam filters using lenses and pinholes located at the focal points to improve the beam quality, the two rods might be used, one on either side of the pinhole, with their rotation speed synchronized to block reflections at a pre-determined time. In FIG. 1, an optional pinhole 40, which may include appropriate lenses, is shown in block form between the beam line tubes 32 of adjacent rotating rod enclosures 30. In this case, owing to the convergence-divergence character of the beam passing through the pinhole the first rod will intercept one side of the beam, while the second, being beyond the focal point will intercept the opposite side (optically speaking). In this case each rod will only have to move half as far in angle in order to block the entire beam, thus effectively doubling the speed of closure of a finite-diameter beam.

Changes and modifications in the specifically described embodiments can be carried out without departing from the scope of the invention, which is intended to be limited by the scope of the appended claims.

We claim:

1. An apparatus for blocking photon or particle beams, comprising:
   a rotatable central shaft;
   means for rotating said rotatable central shaft; and
   at least one tapered rod attached to and penetrating through said rotatable central shaft, wherein both half-lengths of each rod of said at least one tapered rod are tapered in near accordance with a mathematical Gaussian function, wherein the rotation speed and angular position of said at least one tapered rod is synchronized to coincide with the time when a shuttering action is desired.

2. The apparatus of claim 1, wherein said at least one tapered rod comprises fiber composite.

3. The apparatus of claim 1, wherein said at least one tapered rod comprises a metallic alloy.

4. The apparatus of claim 1, wherein said at least one tapered rod comprises a plurality of rods, wherein the angular position of said plurality of rods is oriented with respect to each other to achieve a predetermined sequential shuttering of the photon or particle beams.

5. The apparatus of claim 4, further comprising a pinhole assembly located between adjacent rods comprising a first rod and a second rod of said plurality rods, wherein due to the convergence-divergence character of a beam passing through said pinhole assembly, said first rod will intercept one side of the beam, while said second rod, being beyond the focal point will intercept the opposite side, wherein each rod will only have to move half as far in angle in order to block the entire beam, thus effectively doubling the speed of closure.

6. The apparatus of claim 1, further comprising a magnetic bearing, wherein said rotatable central shaft is levitated by said magnetic bearing.

7. The apparatus of claim 1, further comprising an electrical drive motor, wherein said rotatable central shaft is driven by said electrical drive motor.

8. The apparatus of claim 1, wherein said means for rotating said rotatable central shaft comprise a planar Halbach array angularly driven by motor windings.

9. The apparatus of claim 1, wherein tip speed, $v_t$, in terms of the tensile stress at r=0, of said at least one tapered rod is determined according to the formula:

$$v_t = 2 \left[ \frac{\ln(1/D)}{1-D^2} \right]^{1/2} \sqrt{\frac{S(r=0)}{\rho}} \text{ m/sec.}$$

where $\rho$ is the density of the composite, $S(r=0)$ is tensile stress as a function of radius and D is the ratio of the diameter of the rod at its tip to that at its center.

* * * * *